Patented June 24, 1930

1,768,230

UNITED STATES PATENT OFFICE

HENRY L. BORG, OF STAMFORD, CONNECTICUT, ASSIGNOR TO POSTUM COMPANY, INCORPORATED, OF BATTLE CREEK, MICHIGAN, A CORPORATION OF DELAWARE

FOOD PRODUCT AND METHOD OF MAKING SAME

No Drawing.    Application filed February 15, 1927.    Serial No. 168,473.

The present invention is an improvement in processes of producing a food product and the improved food product obtained thereby, particularly an improved process of producing chocolate and the improved chocolate product obtained.

It has heretofore been customary, in the production of chocolate liquor, to first take the commercial cocoa bean of commerce and subject it to a roasting operation at an elevated temperature. In view of the fact that the cocoa beans of commerce are not of uniform condition, resulting from preliminary treatments in their cleaning and fermentation, and largely vary in their high moisture content (from 8% to 13%) the roasting of these beans at an elevated temperature results in driving off the volatile or aromatic constituents and decomposing the fats, proteids or enzymes, produces an unpleasant odor and a bitter product, and also increases the rancidity of the fats. Further, the application of high temperatures to the beans with such varied moisture contents results in unequal roasting and a nonuniform product. It has heretofore been necessary to sort the beans as to size and to grade them with respect to their origin in an effort to secure a more uniform product, and this grading and sorting which is an expensive and time-consuming step operates to improve the results secured, but the high moisture content of the beans and the temperatures at which they are roasted have resulted and do result in the production of the disagreeable and undesirable characteristics in the final product referred to. Accordingly, the final chocolate liquor generally requires treatment by the additon of flavoring extracts, fats and other compounds having high melting or producing high melting points to make it available as a commercial product.

It is the object of the present invention to provide an improved chocolate making process which shall overcome the above objections by avoiding grading and sorting of the beans, and which shall improve the aroma and taste of the chocolate, the stability under the influence of summer temperatures, and the keeping qualities of the chocolate and products made therefrom. The above and other objects will be described more fully in the detailed description.

The improved process may be practiced in the summer and under a higher atmospheric temperature than is possible with known processes. The present process produces a smooth, uniform product that will remain hard at atmospheric temperatures higher than those to which the ordinary commercial chocolates can be subjected, there is no substantial loss of any aromatic volatile constituents, and practice of the improved process avoids the necessity for adding flavoring material to obscure objectionable flavors that known processes have developed, and also the addition of fats having high melting points and other compounds — so-called hardening compounds — to render the product hard and to prevent softening under the influence of summer temperatures. Further, a finer product having the desirable characteristics indicated is produced in a fraction of the time now necessary for the producton of chocolate, with a much simpler and less expensive installation, and with a labor element reduced to the minimum.

By the present process, it is unnecessary to grade or sort the beans. The ungraded and unsorted beans are first subjected to an excess of moisture which is then driven off until the moisture content of all the beans is substantially uniform and very much less than the moisture content of the normal unroasted bean. The moisture content of the beans is reduced to a low and uniform degree (substantially 1% to 2%) before the bean is subjected to a "roasting" action. The beans thus rendered uniform as to their moisture content are then heat-treated at about 223° F. to 238° F., preferably at atmospheric pressure, and this heat treatment develops the aroma and effects changes resulting in the production or formation in a greater degree of the aromatic principles of volatile fatty esters, in developing the coloring, gelatinizing some of the starch, and rendering soluble albuminous constituents, and rendering the husk readily removable from the kernel. Treatment of the beans at this temperature also removes practically all moisture and avoids the breaking down of the structure of the cell walls and prematurely liberating their contents. The heat used under the conditions named is quite sufficient to bring out the aroma and effect the usual changes without rupturing the cell walls. These cells, because of their high content of esters of fatty acids and acids, may be and are hereinafter designated as "oxcynic" cells. The product obtained by this process can be identified under the microscope by identification of the unruptured oxcynic cell walls. Owing to the cellulose structure of the husk and the low fat content, the husk contains the larger part of the small amount (substantially 1% to 2%) of moisture resulting from the first treatment. The distribution of moisture throughout the hulls enables them to uniformly conduct the heat to the inner kernel of the bean and thereby enables the heat to act uniformly on the bean substance at the low temperature employed regardless of the size of the beans. Owing to the uniform condition of the bean and the fact that the moisture is contained in the husk rather than in the bean itself, a lower temperature may be employed in "roasting," thus preventing decomposition of the fats and certain glucosides, and resulting in a final product which resists change under the action of high atmospheric temperature.

The beans are cooled and then cracked to remove the hulls from the kernels or nibs and subsequently degermed and dehulled. The nibs then go into a reducing and emulsifying device in which the product is reduced to a very fine state of subdivision at a temperature suitable for liquefying the mass. Owing to the low temperature at which the "roasting" was conducted, the cell walls of many of the oxcynic cells withstand this treatment and remain intact. These unruptured cells are held in suspension and when the liquid mass cools impart to the solid greater rigidity and resistance to the softening action of heat. The product that comes from the reducing and emulsifying device is the "chocolate liquor" that is to be used. This chocolate liquor is characterized by containing undecomposed oxcynic cell structures which may be identified under the microscope by the use of suitable stains such as picric acid, rosolic and osmic acid. The product of this process may be further identified by the fact that it has been subdivided to from 24,000,000 to 27,000,000 particles per gramme.

The following is a detailed statement of the process which has been found to produce the above results:—

The cocoa beans of commerce as they appear on the market are first thoroughly cleaned but ungraded and unsorted and are placed in a rotating cylinder provided with means for heating, and of producing a vacuum. To a charge of about 1,000 pounds of beans there is added about 25% of boiling water. The beans are then subjected to agitation while being maintained at a temperature of about 120° to 130° F. for about twenty minutes. The effect of this first treatment is to moisten the beans and to initially start the action of the enzymes on the cell contents of the beans.

After this first heat treatment, the beans are subjected to a second heat treatment, preferably in the same rotating cylinder, of from 165° to 170° F. for half an hour, under reduced pressure (vacuum 26" to 27"). The purpose of this second heat treatment is to reduce the moisture of the bean to from 1% to 2% while the beans are in an atmosphere very low in oxygen content, thus avoiding oxidation at this point. This moisture, as stated above, is mostly carried by the shell wall or husk of the bean, traces only appearing in the kernel itself.

These two heat treatments and enzyme action render the beans of uniform character or composition and peculiarly adapt them for the "roasting" action, so that the "roasting" can be uniformly conducted or standardized and accomplished at a much lower temperature and in a shorter time. As stated above, this pre-roasting action avoids the necessity for grading or sorting of the beans. This is an important feature of the invention.

The beans are then subjected to a further heat treatment for the purpose of developing the aroma and flavor and removal of the last traces of moisture. This heat treatment is at a temperature of about 106° to 110° C., preferably at atmospheric pressure, and the beans are agitated or stirred during this heat treatment. Owing to the preliminary moistening and drying of the beans, as above stated, the heat is conducted uniformly through the shell walls and acts upon the cell contents of the beans, such as the starches, sugars and albuminous materials, to bring about therein those changes that deal with and control the production of aroma without breaking down the oxcynic cell walls, and at a much lower temperature than heretofore, while preserving the constitution of the fats, thus securing a higher melting point and greater stability in the product than heretofore. By virtue of the low temperature combined with the normal atmospheric pressure employed in "roasting", the aroma and flavor are more delicate and are substantially free from bitter and burnt flavor.

After this heat treatment, the beans are rapidly cooled to substantially room temperature of about 65° to 70° F. It has been found that cooling by suction facilitates rapid cooling and prevents reabsorption of the moisture.

The beans are then cracked to remove the hulls, and are subsequently degermed and dehulled.

After the beans are dehulled and degermed, the nibs are passed into a disintegrating and emulsifying device in which the product is reduced to the required degree of fineness. The mass in this device is maintained in a confined space whereby the volatile constituents are retained and the mass prevented from absorbing moisture from the atmosphere, but at the same time maintaining the temperature in the device sufficiently low to prevent rupture of the oxcynic cells, oxidation of the fats, decomposition of certain glucosides, and the aromatic or volatile compounds produced, from escaping. It is pointed out that the non-rupturing of the walls of the oxcynic cells which are throughout the cocoa mass will result in holding in suspension the particles of fat contained in said oxcynic cells. The effect of the action of the disintegrating and emulsifying device is to finely subdivide the mass, thus effecting a smooth and uniform product. The extent of the subdivision is preferably from 24,000,000 to 27,000.000 particles per gramme. The operating temperature in this device is scarcely above the point for liquefying of the substance, that is to say, 90° to 100° F. This temperature is much below that which would effect the decomposition or rupture of the oxcynic cells and liberation of their fatty contents into the mass. The liquid as it issues from the device is from 20 to 38 B., is practically moisture free, and is conducted away at the liquefying temperature of the product.

If this chocolate liquor is to be used as a confection, it is immediately passed into a receiver without further treatment, such as tempering, while maintaining it in its liquid form and preventing any solidification, and sugar and milk are incorporated with the basic chocolate liquor, and the chocolate liquor, sugar and milk are further emulsified in a similar manner whereby "coating liquor" or "eating chocolate" are produced.

This process results in a product that is readily identified because the oxcynic cells are unruptured and can be seen in their unruptured condition by a microscope. This non-rupturing of the oxcynic cells results from the low temperatures employed, combined with the treatment prior to roasting wherein scientific control of the moisture content and the character of reactions in the bean such as fermentation, enzyme action, and the like is attained. Further the product is an alkali-free one, since it avoids the use of alkali treatment of the beans, and further, in view of the absence of moisture, the "roasted" beans can be treated in melangeurs and conches employing iron abrasive surfaces without imparting thereto a metallic flavor. Where the results of the so-called Dutch process are desired, saponification of fat can be produced or carried out in the emulsifying device, without the addition of alkali, thereby avoiding the disagreeable flavors oftentimes produced by the presence of alkali compounds. This saponification could be produced by subjecting the liquor to steam under pressure (about 7 atmospheres) or by adding some of the cocoa fat that has been subjected to steam under pressure. This saponification process renders the chocolate so-called "soluble" cocoa, making a fine suspension when the cocoa is cooked. This would be done in the emulsifying and disintegrating device.

The freedom from moisture in the final product prevents decomposition which time and temperature otherwise produce when present, and maintains the product with a comparatively high melting point because of the fact that the fats have not been decomposed or ruptured or subjected to oxidation by exposure to atmospheric conditions. The fat globules to a large extent are distributed in microscopic fineness in a solid matrix in their natural cell containers and give marked stability to the chocolate substance.

It is pointed out that, from the treatment in the disintegrating and emulsifying device to the finished chocolate, the temperature is maintained substantially uniform at the critical temperature of the process, thereby avoiding solidification of the chocolate until the desired article is finally formed. Further, the reducing and emulsifying action in said device avoids any necessity for refining which has characterized processes heretofore employed.

The improved process results in a superior product having the described characteristics which is utilizable for any of the purposes for which chocolate is desired. It has been found, however, that the chocolate so produced is particularly adapted for association with bran flakes as produced by U. S. Patent No. 1,483,515. These bran flakes have been roasted at elevated temperatures and are substantially free from moisture. They present extended surfaces and are friable and porous and are peculiarly adapted for absorption of fats having low melting points which are present in the chocolate mass, such as the oleines. Further, owing to the moisture free product as produced by the above chocolate process, these flakes will remain in a friable and brittle condition in the chocolate mass for an indefinite period, and the presence of these flakes further increases the stability and heat resisting qualities of the chocolate because of their spongy nature and differential affinity for the low-melting-point fats of the chocolate.

The result is a confection which remains firm and hard at temperatures which soften and liquefy other chocolate products.

The chocolate produced by this process is as dark as that produced by the Dutch process and is produced without the use of artificial coloring matter. The chocolate can, by reason of its dark color, be spread thin and at the same time, by reason of the presence of the aromatics which have not been lost by volatilization, has a full chocolate flavor. For this reason a given quantity of chocolate manufactured by the present process will produce fifteen to twenty percent more covering for cakes and confections. This is an item of great importance so far as cake and candy manufacturers are concerned as it involves a vast economy and saving for them.

It is to be understood that, while the chocolate produced by the improved process as set forth is peculiarly adapted for use in connection with the bran flakes, it is also peculiarly adapted for use in coating or covering other substances or for consumption alone as a confection; or for use as a beverage, in which event part of the cocoa fat would be removed as is well understood in the art.

By following the steps of this process an absolutely uniform product is obtained, regardless of the geographical origins of the cocoa beans or the original moisture content, and the personal equation is entirely eliminated. The condition of the roast is no longer, as heretofore, a matter of individual judgment; and for the first time the production from beginning to end is reduced to a matter of definite timed procedure.

What is claimed is:—

1. The process of roasting cocoa beans which consists in subjecting the bean to the action of moisture in the presence of heat, then reducing the moisture content of the bean to about two percent thereby rendering the shell uniformly heat conductive, and then subjecting the beans to a heat treatment of from 106° to 110° C.

2. The process of treating cocoa beans containing active enzymes which consists in subjecting the beans to an excess of moisture and at a temperature below that destructive of the enzymes, then removing this excess of moisture together with a portion of the original moisture of the bean, and then subjecting the beans to a heat treatment of from 106° to 110° C.

3. The process of treating cocoa beans containing active enzymes which consists in subjecting the beans to an excess of moisture and at a temperature below that destructive of the enzymes, then removing this excess of moisture together with a portion of the original moisture of the bean, and then roasting the bean below the decomposing temperature of the cell walls containing the fats.

4. The process of treating cocoa beans consisting in adding an excess of moisture, heating the beans below a temperature destructive of the enzymes therein and reducing the percentage of moisture substantially to two percent in the presence of a vacuum, and then subjecting the beans to a heat treatment below that destructive of the cell structure to remove the remaining moisture and to develop aroma in the beans.

5. The process of treating cocoa beans which consists in subjecting the beans to the action of added moisture at a temperature below that destructive of the active enzymes, then eliminating the added moisture and a part of the natural moisture of the bean, then subjecting the bean to a heat treatment to develop aroma without destruction of cell structure, then cooling the beans to substantially room temperature, then dehulling and degerming the same, and then reducing and emulsifying the nibs at a liquefying temperature.

6. In the process of making chocolate consisting in treating cocoa beans as defined in claim 3, the added step of incorporating roasted bran flakes to act as an absorbing element for the low-melting-point fats and reenforcing the stability of the resulting product under the influence of elevated atmospheric temperatures.

7. The process of making chocolate, consisting in subjecting chocolate beans to moisture and at a temperature below that destructive of enzymes, then subjecting the beans to a temperature of 165° to 170° F. under reduced pressure to reduce the content of moisture to about 1% to 2%, developing the aroma and flavor of the beans by heating said beans from 223° to 238° F. while stirring, separating the nibs, and disintegrating and emulsifying the latter out of contact with the air.

8. The process of making chocolate, consisting in subjecting chocolate beans to moisture and at a temperature below that destructive of enzymes, then subjecting the beans to a temperature of 165° to 170° F. under reduced pressure to reduce the content of moisture to about 1% to 2%, developing the aroma and flavor of the beans by heating said beans from 223° to 238° F. while stirring, separating the nibs, disintegrating and emulsifying the latter out of contact with the air, and then partly saponifying the fats present in the product by subjecting the latter to steam under pressure.

9. A cocoa product characterized in that the cell walls of the oxcynic cells of the cocoa bean retain their identity and can be recognized by identifying stains and in that the characteristics of the raw product are preserved substantially unchanged.

10. A chocolate product produced from cocoa in which the oxcynic cells retain their identity and in which the fats of low-melting-point are absorbed by roasted cereal flakes.

11. A chocolate product substantially free of moisture and characterized in that the cell walls of the oxcynic cells of the cocoa bean retain their identity.

In testimony whereof I have signed this specification.

HENRY L. BORG.

CERTIFICATE OF CORRECTION.

Patent No. 1,768,230.  Granted June 24, 1930, to

HENRY L. BORG.

It is hereby certified that the above numbered patent was erroneously issued to "Postum Company, Incorporated", whereas said patent should have been issued to "General Foods Corporation, of Battle Creek, Michigan, a Corporation of Delaware", said corporation being assignee of the entire interest in said invention, as shown by the records of assignments in this office; and that the said Letters Patent should be read with this correction therein that the same may conform to the record of the case in the Patent Office.

Signed and sealed this 5th day of August, A. D. 1930.

(Seal)

Wm. A. Kinnan,
Acting Commissioner of Patents.

nized by identifying stains and in that the characteristics of the raw product are preserved substantially unchanged.

10. A chocolate product produced from cocoa in which the oxcynic cells retain their identity and in which the fats of low-melting-point are absorbed by roasted cereal flakes.

11. A chocolate product substantially free of moisture and characterized in that the cell walls of the oxcynic cells of the cocoa bean retain their identity.

In testimony whereof I have signed this specification.

HENRY L. BORG.

CERTIFICATE OF CORRECTION.

Patent No. 1,768,230.                                   Granted June 24, 1930, to

HENRY L. BORG.

It is hereby certified that the above numbered patent was erroneously issued to "Postum Company, Incorporated", whereas said patent should have been issued to "General Foods Corporation, of Battle Creek, Michigan, a Corporation of Delaware", said corporation being assignee of the entire interest in said invention, as shown by the records of assignments in this office; and that the said Letters Patent should be read with this correction therein that the same may conform to the record of the case in the Patent Office.

Signed and sealed this 5th day of August, A. D. 1930.

(Seal)

Wm. A. Kinnan,
Acting Commissioner of Patents.